United States Patent

Shiraishi

[11] Patent Number: 5,373,307
[45] Date of Patent: Dec. 13, 1994

[54] IMAGE DISPLAY DEVICE FOR DISPLAYING AN IDENTICAL IMAGEA ON ITS DISPLAY PANEL AND AN EXTERNAL DISPLAY UNIT, BUT CAPABLE OF FREEZING AND ERASING AN IMAGE ON THE LATTER

[75] Inventor: Tai Shiraishi, Nara, Japan

[73] Assignee: Sharp Kabushiki Kaisha, Osaka, Japan

[21] Appl. No.: 787,883

[22] Filed: Nov. 5, 1991

[30] Foreign Application Priority Data

Nov. 9, 1990 [JP] Japan .................................. 2-305010

[51] Int. Cl.$^5$ .............................................. G09G 3/02
[52] U.S. Cl. ......................................... 345/2; 345/115; 345/185
[58] Field of Search ............... 340/717, 716, 721, 706, 340/711, 748, 799, 750; 358/22, 181, 183; 345/2, 1, 3, 122, 123, 185, 115, 116, 117; 348/559, 564, 566, 567

[56] References Cited

U.S. PATENT DOCUMENTS

| | | | |
|---|---|---|---|
| 4,677,570 | 6/1987 | Taki | 340/717 |
| 4,684,935 | 8/1987 | Fujisaku et al. | 340/717 |
| 4,730,186 | 3/1988 | Koga et al. | 340/716 |
| 4,760,387 | 7/1988 | Ishii et al. | 340/720 |
| 4,777,531 | 10/1988 | Hakamada et al. | 358/183 |
| 4,926,166 | 5/1990 | Fujisawa et al. | 340/717 |
| 4,974,173 | 11/1990 | Stefik et al. | 340/717 |
| 4,980,678 | 12/1990 | Zenda | 340/716 |
| 5,150,109 | 9/1992 | Berry | 340/717 |

*Primary Examiner*—Ulysses Weldon
*Assistant Examiner*—Xiao M. Wu
*Attorney, Agent, or Firm*—Nixon & Vanderhye

[57] ABSTRACT

An image display device displays an identical image based on display data output from a display control circuit on its own display panel and an external display unit connected to the device through an interface. The device can erase and freeze an image on the external display unit in an erase mode and a freeze mode, respectively, while the display panel displays different images. In order to do so, this device has a frame memory circuit for storing and outputting display data received from the display control circuit toward the external display unit and a disable circuit for stopping data received from the frame memory circuit from being output and instead outputting monochromatic or single-color data to the external display unit. The frame memory circuit inhibits data stored in its memory from being rewritten during the freeze mode. The disable circuit outputs the monochromatic data in the erase mode. During the freeze mode and the erase mode, the display panel can display a freeze sign and an erase sign, respectively, along with an image, by means of a sign pattern generator and a synthesize circuit. The sign pattern generator, the synthesize circuit, the frame memory circuit and the disable circuit are controlled by a control circuit which is also controlled by a CPU.

7 Claims, 8 Drawing Sheets

IMAGE DISPLAY DEVICE FOR DISPLAYING AN IDENTICAL IMAGEA ON ITS DISPLAY PANEL AND AN EXTERNAL DISPLAY UNIT, BUT CAPABLE OF FREEZING AND ERASING AN IMAGE ON THE LATTER

BACKGROUND OF THE INVENTION

1. Field of the Invention

The present invention relates to an image display device which displays an identical image both on its own display screen such as a display panel and on an external display such as a cathode ray tube (CRT) at the same time.

2. Description of the Prior Art

Recently, the following image display device has been put into practice. This image display device is incorporated in a portable computer such as a lap-top computer having a built-in display panel which is part of the image display device. The image display device is provided with a means for connecting an external display unit such as CRT thereto. Thus, when the external display unit is connected, the image display device can display an identical image both on its own display panel and on the external display unit at the same time.

Figure 1:
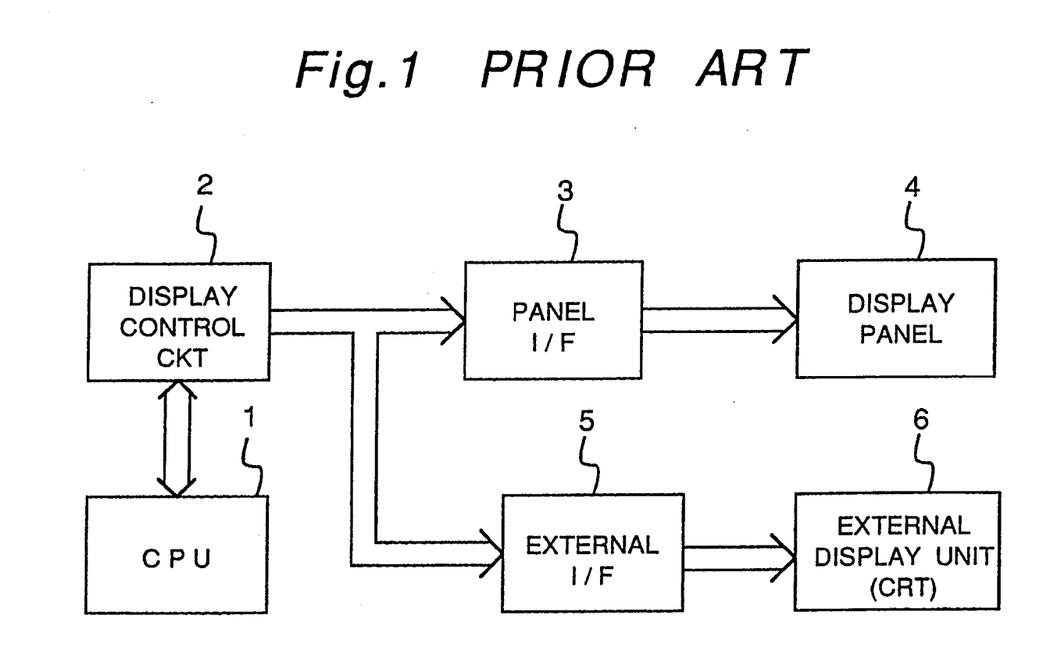
FIG. 1 is a block diagram of the prior art image display device incorporated in a portable computer.

FIG. 1 is a block diagram of the above image display device. As shown in FIG. 1, the image display device is essentially constituted from a CPU 1, a display control circuit 2, a panel interface 3, an external interface 5, and the display panel 4. An external display unit 6 such as CRT is connected to the external interface 5.

The display control circuit 2 has a display controller and a video random access memory (V-RAM). This circuit outputs display data to the panel interface 3 and the external interface 5. The display data essentially consists of a digital video signal and a synchronous signal for driving the interfaces 3 and 5, the display panel 4 and the external display unit 6. The display data are generated from image information read out from the V-RAM by the display controller.

The panel interface 3 converts the display data output from the display control circuit 2 to data adapted to the display panel 4 (this data will be referred to as panel display data below). Based on the panel display data, the corresponding image is displayed on the panel display 4. On the other hand, the external interface 5 converts the display data output from the display control circuit 2 to data adapted to the external display unit 6 (this data will be referred to as external display data below). Displaying of an image on the external display unit is performed based on the external display data. In this way, the same image is displayed on the display panel 4 and the external display unit 6 at the same time.

The above image display device having a function of displaying an identical image on its display panel and the external display unit at the same time offers a lot of advantages. Especially, the image display device is useful if used as an auxiliary instrument for lectures, presentation, etc., because it is possible to present pictures by means of the external display unit 6 to a lot of people at the same time. However, unfortunately, this device does not have a function of erasing or halting a picture on a screen of the external display unit 6 when required. Therefore, even when one operates the image display device in order to search for a desired image, for example, images on the display panel 4, which are not necessarily required to be presented to an audience, are also displayed on the external display unit 6. In short, the image display device cannot control display conditions of the external display unit.

SUMMARY OF THE INVENTION

The object of the present invention is therefore to provide an image display device which has functions halting or freezing and erasing a picture on a screen of the external display unit when required and which can display on its display means the display conditions of the external display unit.

In order to accomplish the above object, an image display device of an embodiment of the present invention comprises a central processing unit, a display control circuit for outputting image data corresponding to an image to be displayed and a synchronous signal under control of the central processing unit, the image data and the synchronous signal constituting display data, a display means for-displaying an image based on the display data output from the display control circuit, a first interface connected with the display means, a second interface connectable with an external display means, a memory circuit connected between the display control circuit and the second interface, a disable circuit, a sign pattern generator, a synthesize circuit and a control circuit.

The memory circuit has an internal memory to and from which display data received from the display control circuit is written and read out. This memory circuit has a write mode wherein display data in the internal memory is rewritten and the rewritten display data is output from the memory circuit, and a write inhibit mode wherein rewriting of display data in the internal memory is inhibited such that the display data stored in the internal memory without being rewritten is read out and output from the memory circuit.

The disable circuit which is connected between the memory circuit and the second interface inhibits, when in operation, display data received from the memory circuit from being output to the second interface, and outputs monochromatic display data instead of the display data received from the memory circuit such that a screen of the external display means exhibits a single color such as blue, red, etc.

On receiving the synchronous signal from the display control circuit, the sign pattern generator outputs pattern data corresponding to a sign indicating display conditions of the external display means at the display timing.

The synthesize circuit, when in operation, synthesizes display data received from the display control circuit and pattern data received from the sign pattern generator and outputs the synthesized display data to the display means through the first interface.

The control circuit controls the memory circuit and the disable circuit under control of the central processing unit such that:

a) during a normal mode of the image display device wherein an identical image is displayed on the display means and the external display means at the same time, the memory circuit assumes the write mode and the disable circuit does not operate;

b) during a freeze mode of the image display device wherein an image on the screen of the external display means is frozen, the memory circuit assumes the write inhibit mode, and the disable circuit does not operate; and c) during an erase mode of the image display device wherein an image is erased from a screen of the external display means, the disable circuit operates.

The control circuit also controls the synthesize circuit such that the pattern data received from the sign pattern generator and the display data received from the display circuit are synthesized only when the image display device is in the freeze mode and in the erase mode.

The image display device operates as follows. During the normal mode of the image display device, because the synthesize circuit is stopped from operating by the control circuit, display data output from the display control circuit are sent to the display means through the synthesize circuit and the first interface, without being synthesized with pattern data. On the other hand, the display data which are output from the display control circuit and written to the internal memory of the memory circuit are read out therefrom and output. Because the disable circuit is out of operation, the output display data pass the disable circuit to the external display means via the second interface. As a result, an identical image is displayed based on the display data on the display means and the external display means at the same time.

During the freeze mode, the disable circuit is stopped from operating and the synthesize circuit is allowed to operate. In addition, writing to the internal memory of the memory circuit is inhibited. Therefore, new display data received from the display control circuit are not written to the internal memory, and display data already stored therein are read out and output to the disable circuit. Because the disable circuit is out of operation, the output data from the memory circuit pass The disable circuit to the external display means via the second interface. On the other hand, because the synthesize circuit is in operation, the new display data output from the display control circuit and pattern data output from the sign pattern data are synthesized by the synthesize circuit. The synthesized data are sent to the display means via the first interface. As a result, while the display means displays images with a freeze sign, the external display means keeps displaying a static image which was being displayed when the image display device was brought into this freeze mode.

During the erase mode, the disable circuit and the synthesize circuit are allowed to operate. Therefore, display data output from the memory circuit are stopped by the disable circuit. Instead, monochromatic data are output from the disable circuit to the external display means. As a result, a screen of the external display means turns monochromatic, the preceding image being erased. On the other hand, the display data output from the display control circuit and pattern data output from the sign pattern generator are synthesized by the synthesize circuit. The synthesized data are sent to the display means via the first interface. And images are displayed with an erase sign indicating that the screen of the external display means has been erased. That is, the screen of the external display means can be erased while the display means displays images with the erase sign.

BRIEF DESCRIPTION OF THE DRAWINGS

The present invention will become more understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
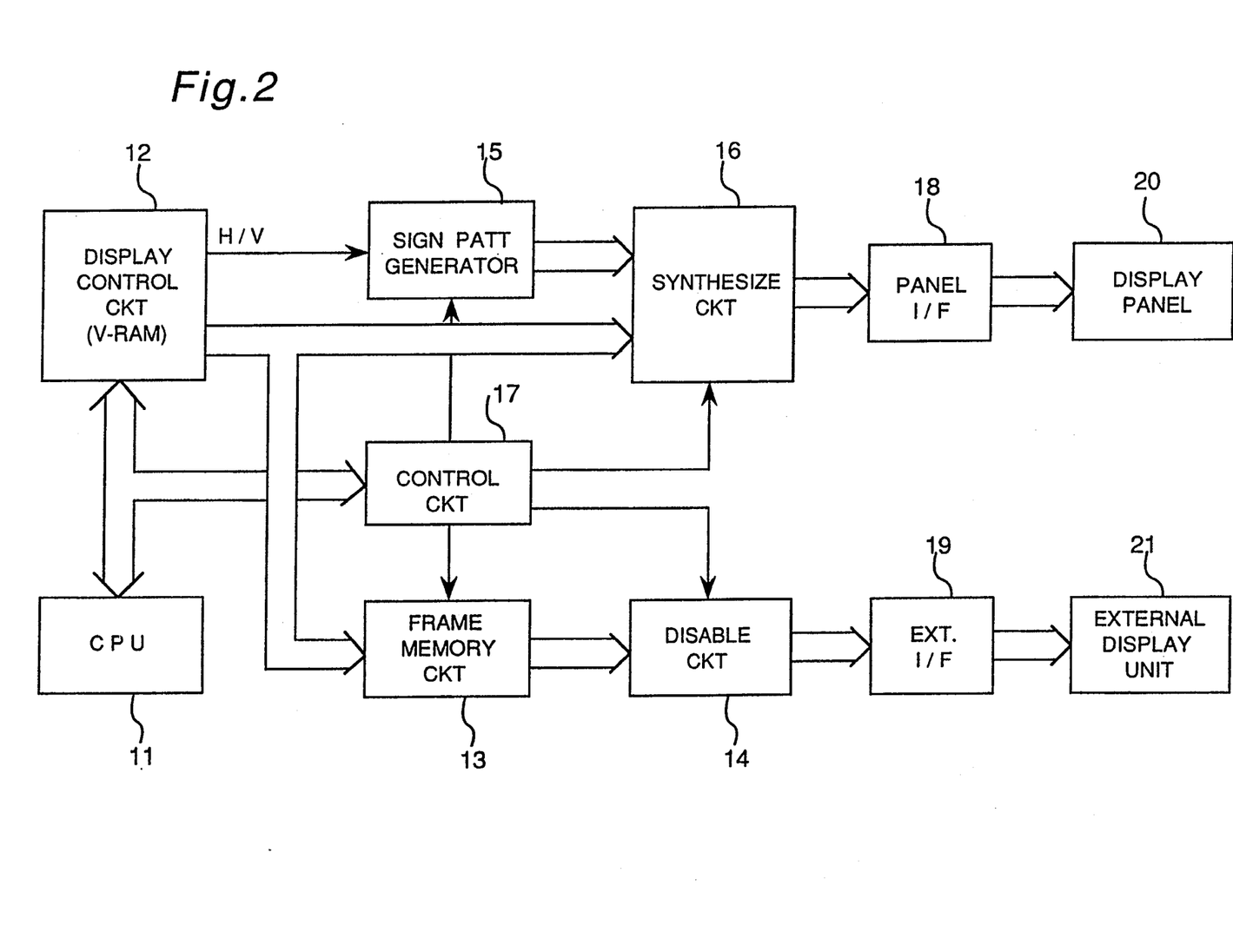
FIG. 2 is a block diagram of an image display device according to an embodiment of the present invention.

An image display device according to an embodiment of the present invention is for a portable computer having a built-in display panel 20 and being connectable with an external display unit 21, as shown in FIG. 2.

This image display device consists of a CPU 11, a display control circuit 12, a frame memory circuit 13, a disable circuit 14, a sign pattern generator 15, a synthesize circuit 16, a control circuit 17, a panel interface 18, an external interface 19 and the display panel 20. The external display unit 21 such as a CRT is connected to the external interface 19.

The display control circuit 12 is similar to the display control circuit 2 of the conventional image display device of FIG. 1 and outputs display data to the synthesize circuit 16 and the frame memory circuit 13 under control of the CPU 11. The display data output from the display control circuit 12 contains image data (a digital video signal) and a synchronous signal. The above four circuits, i.e., the frame memory circuit 13, the disable circuit 24, the sign pattern generator 15 and the synthesize circuit 16 are essential parts of the present invention, operating as follows.

The frame memory circuit 13 has a write mode and a write inhibit mode. In the write mode, this circuit 13 continually writes display data received from the display control circuit 12 to its frame memory and continually reads the display data from the frame memory. Data input to the frame memory circuit are output therefrom with a delay of one frame. In the write inhibit mode, a write operation to the frame memory is inhibited. Switching between the write and write inhibit modes is performed by the control circuit 17 which is operated under control of the CPU 11.

The disable circuit 14 comes into operation under control of the control circuit 17 and stops outputting display data received from the frame memory circuit 13. Then, this circuit 14 outputs monochromatic data to make a screen of the external display unit 21 exhibit a single color. As a result, an image on the external display unit is erased. When the disable circuit 14 is out of operation, the display data output from the frame memory circuit 13 passes through the disable circuit 14 to the external interface 19.

When the image display device is in the freeze mode in which an image on a screen of the external display unit 21 is frozen, that is, the external display unit 21 displays a static image, and in the erase mode in which the screen of the external display unit is erased, signs respectively indicative of these modes are displayed on the display panel 20. Under control of the control circuit 17, the sign pattern generator 15 generates and outputs pattern data corresponding to those signs in synchronization with the displaying timing of the panel display 20 in response to a horizontal/vertical synchronous signal H/V output from the display control circuit 12. The pattern data can be stored in advance in a memory of the sign pattern generator 15 so that the pattern data corresponding to the selected mode are only read out from the memory. The signs indicative of the freeze mode and the erase mode will be referred to as a freeze sign and an .erase sign, respectively.

The synthesize circuit 16 operates under control of the control circuit 17 to synthesize the display data from the display control circuit 12 and the pattern data from the sign pattern generator 15 and output the synthesized data as synthesized display data. When the synthesize circuit 16 is out of operation, the display data output from the display control circuit 12 passes the synthesize circuit 16 to the panel interface 18 without being synthesized.

The panel interface 18 converts the non synthesized display data or synthesized display data received from the synthesize circuit 16 to a panel display data adapted to the display panel 20. The display panel 20 displays an image based on the panel display data.

On the other hand, the external interface 19 converts the display data and monochromatic data received from the disable circuit 14 to an external display data adapted to the external image display unit 21. The external image display unit 21 displays an image based on the external display data.

Figure 10:
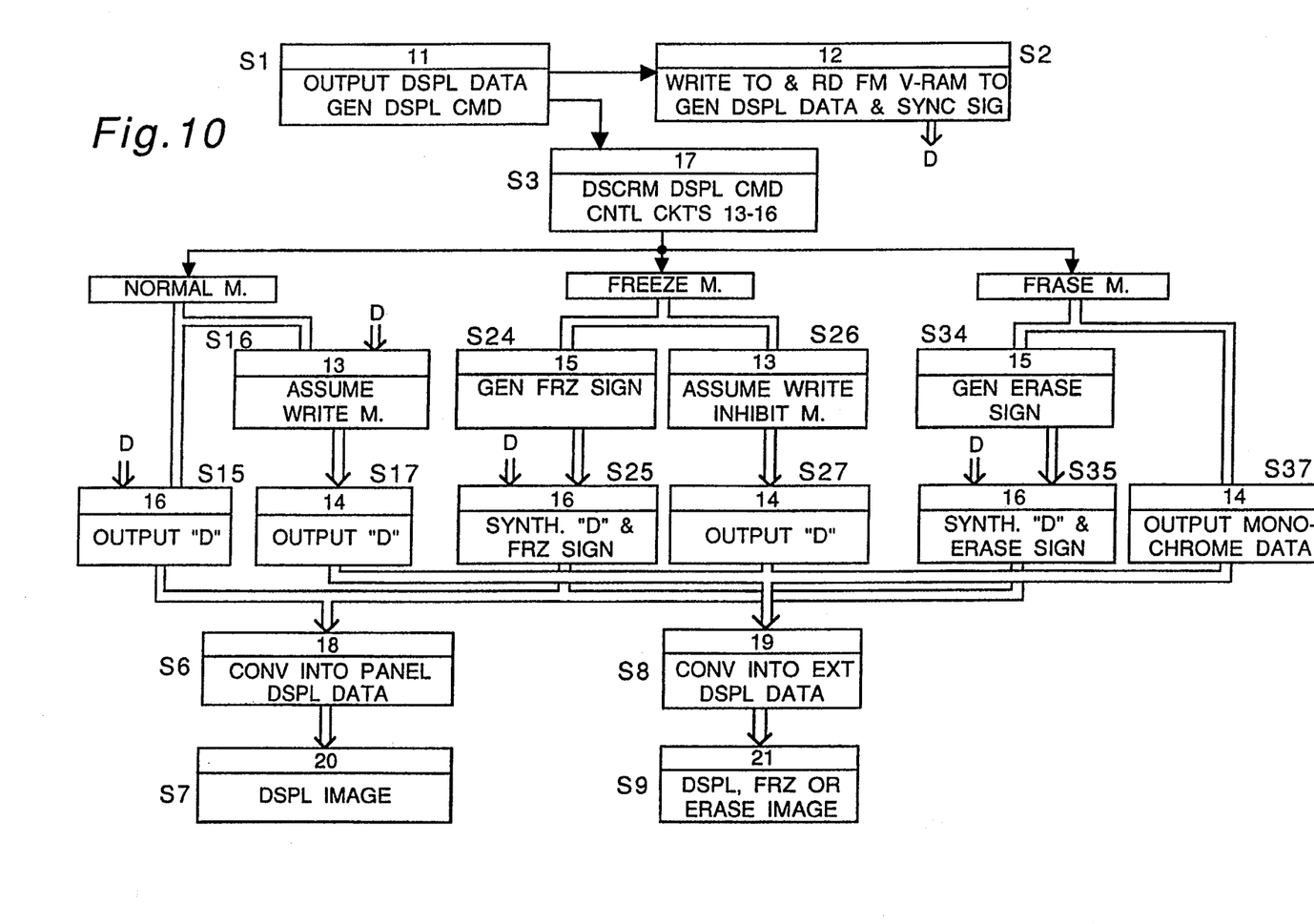
FIG. 10 is a flow chart showing operations in the normal mode, freeze mode and erase mode of the image display device of FIG. 2.

The image display device with the above construction operates as shown in FIG. 10 and as described below in the three operation modes. In FIG. 10, numbers described in an upper portion of blocks at respective steps indicate the reference numbers designating the corresponding circuits.

A) NORMAL MODE

The CPU 11 generates a display command indicating one of the normal, freeze and erase modes at step S1. This command is sent to the control circuit 17. Upon receipt of the display command from the CPU 11, the control circuit discriminates what the display command is, and controls the frame memory circuit 13, disable circuit 14, sign pattern generator 15 and synthesize circuit 16 based on the discrimination result at step S3. On the other hand, the CPU 11 sends display data to the display control circuit 12 at step S1. At step S2, in the display control circuit 12, the display data is written to the V-RAM. The display control circuit 12 reads display data from the VRAM and outputs the display data and the synchronous signal H/V. These steps S1, S2 and S3 are common to all of the three operation modes.

Therefore, these steps will be omitted from description on the operation in the freeze mode and the erase mode.

Under control of the control circuit 17, the disable circuit 14 and the synthesize circuit 16 stop operating, while the frame memory circuit 13 assumes the write mode.

Figure 6A:
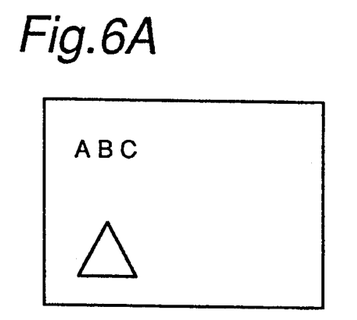
FIGS. 6A and 6B are respectively display examples on a display panel and an external display unit during the normal mode of the image display device of FIG. 2.

Under this condition, at step S15, the display data output from the display control circuit 12 to the synthesize circuit 16 are output to the panel interface 18 without being synthesized with pattern data output from the sign pattern generator. The display data not synthesized are converted to panel display data by the panel interface 18 at step S6 so that an image is reproduced on the display panel 20 at step S7, as shown in FIG. 6A.

Figure 6B:
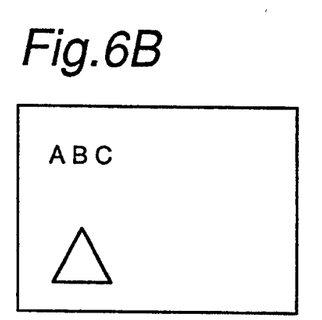

On the other hand, the display data sent to the frame memory circuit 13 are continually written to the frame memory. Then the display data written in the frame memory are continually read out and output to the disable circuit 14 with a delay of a single frame at step S16. The display data input to the disable circuit 14 are output, without being halted, to the external interface 19 at step S17. The display data are converted by the external interface 19 to external display data at step S8 so that the image corresponding to the display data given by the display control circuit 12 is regenerated on the external image display unit 21 based on the external display data at step S9, as shown in FIG. 6B.

Thus, the same image is displayed on the display panel 20 and the external display unit 21 at the same time in this normal mode.

Figure 3:
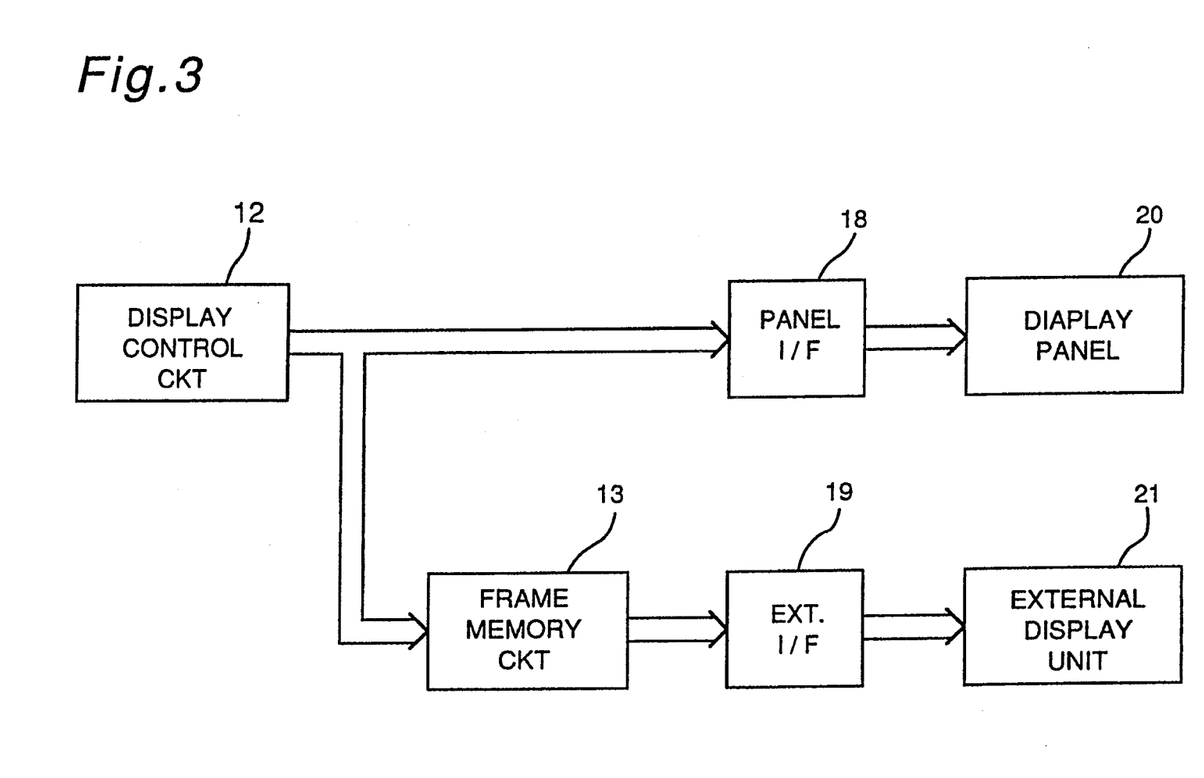
FIG. 3 is a block diagram of an image display device equivalent to the image display device of FIG. 2 when it is in the normal mode.

The construction of the image display device in the normal mode is equivalent to that shown in FIG. 3 in terms of flow of data sent to the display panel 20 and the external display unit 21. It is to be noted that the CPU 11 and the control circuit 17 are omitted from FIG. 3.

B) FREEZE MODE

Under control of the control circuit 17, the disable circuit 14 is stopped from operating, the synthesize circuit is allowed to operate, and the frame memory circuit 13 assumes the write inhibit mode.

Figure 7A:
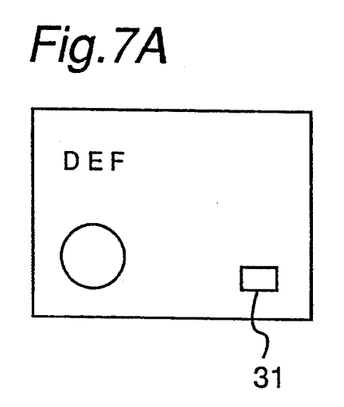
FIGS. 7A and 7B are respectively display examples on the display panel and the external display unit during the freeze mode of the image display device of FIG. 2.

Under this condition, at step S25, the synthesize circuit 16 synthesizes display data newly received from the display control circuit 12 with the pattern data, generated by the sign pattern generator 15 at step S24, corresponding to the freeze sign. The synthesized display data is sent to the panel interface 18 and then converted by the panel interface 18 to panel display data at step S6, so that at step S7 an image is displayed on the display panel 20, along with the freeze sign 31, as shown in FIG. 7A.

Figure 7B:
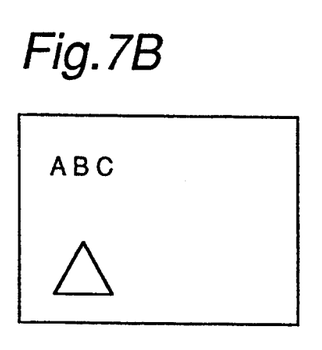

On the other hand, at step S26, because the frame memory circuit 13 is under the write inhibit mode, the display data sent thereto from the display control circuit 12 are not written to the frame memory. Therefore, the preceding display data which are stored in the frame memory is read out and output to the disable circuit 14 as a static display data. This static display data keeps being sent to the disable circuit 14 till the write inhibit mode is cancelled. The static display data input to the disable circuit 14 is output therefrom, without being halted, to the external interface 19 at step S27. At step S8, the static display data is converted by the external interface 19 to an external display data, based on which a static image is displayed on the screen of the external display unit 21 at step S9. As obvious from the above description, the image on the screen of the external display unit 21 is not changed in this freeze mode even though images on the panel display are changed. Therefore, if the image display device is brought into this freeze mode when the external display unit 21 displays the image shown in FIG. 6B, the image of FIG. 6B is kept being displayed on the external display unit 21 during the freeze mode, as shown in FIG. 7B.

Figure 4:
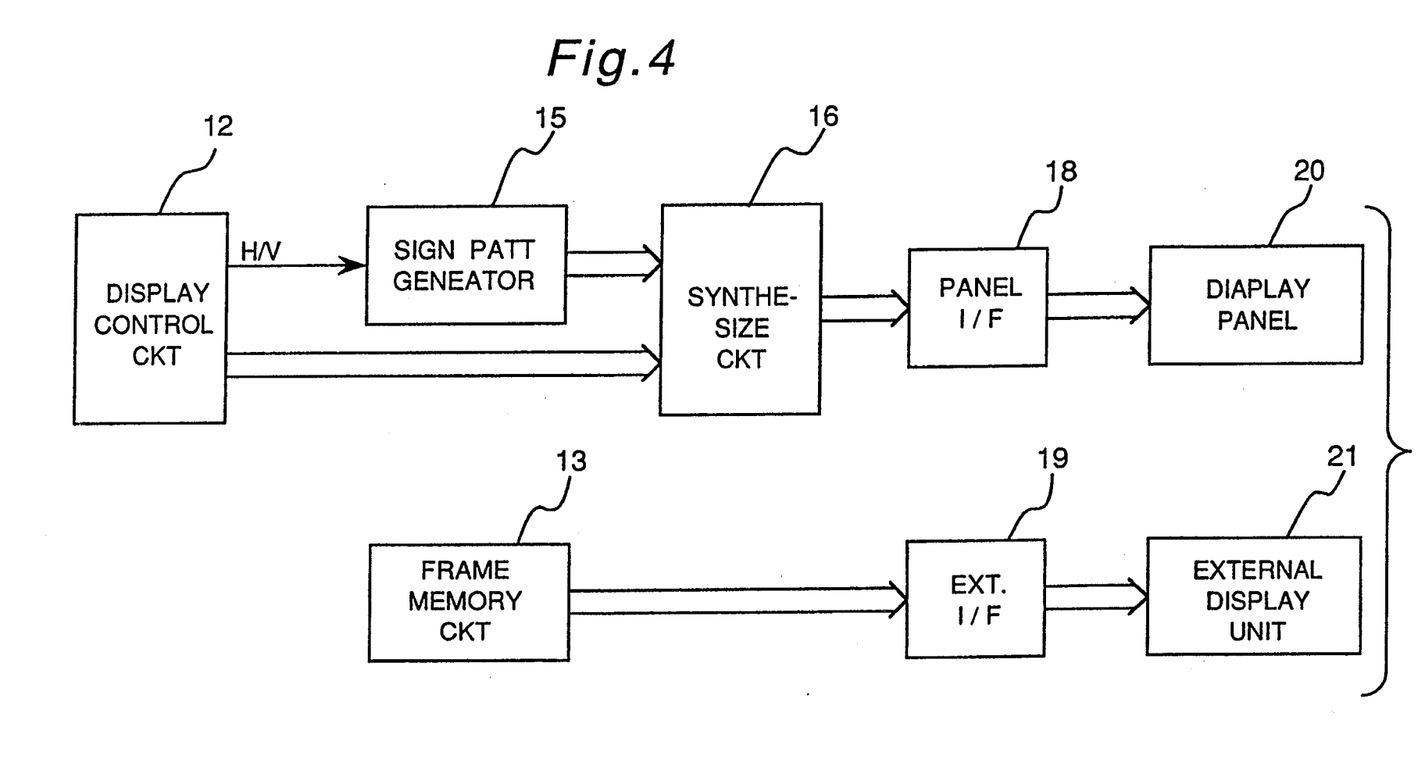
FIG. 4 is a block diagram of an image display device equivalent to the image display device of FIG. 2 when it is in the freeze mode.

The construction of the image display device in the freeze mode is equivalent to that shown in FIG. 4 in terms of flow of data to be sent to the display panel 20 and the external display unit 21. The CPU 11 and the control circuit 17 are omitted from FIG. 4.

C) ERASE MODE

Under control of the control circuit 17, the disable circuit 14 and the synthesize circuit 16 are allowed to operate, and the frame memory circuit 13 selects the write mode. The frame memory circuit 13 can select the write inhibit mode, too.

Figure 8A:
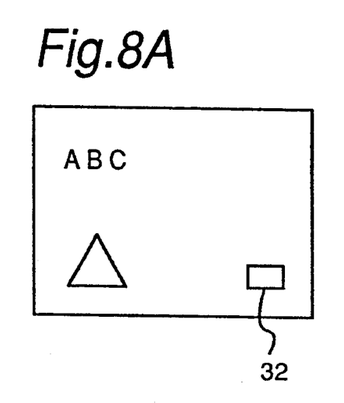
FIGS. 8A and 8B are respectively display examples on the display panel and the external display unit during the erase mode of the image display device of FIG. 2.

Under this condition, at step S35, the synthesize circuit 16 synthesizes display data received from the display control circuit 12 with the pattern data, generated by the sign pattern generator at step S34, for the erase sign, so that synthesized display data is generated and sent to the panel interface 18. At step S6, the synthesized display data is converted by the panel interface 18 to panel display data adapted to the display panel 20, so that at step S7 an image is displayed on the display panel 20, along with the erase sign 32, as shown in FIG. 8A.

Figure 8B:
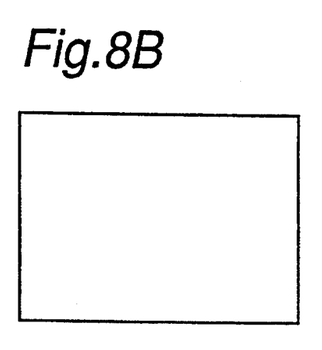

On the other hand, the display data sent to the frame memory circuit 13 from the display control circuit 12 are written to the frame memory. Then, the display data is read out and sent to the disable circuit 14. However, because the disable circuit 14 is now in operation, the display data is stopped from being output from the disable circuit 14. Instead, monochromatic display data is output to the external interface 19 at step S37. This monochromatic display data is sent to the external display unit 21 after converted, at step S8, to an external display data by the external interface 19, so that the whole screen becomes blue, for example, in other words, the screen of the external display unit 21 is erased at step S9, as shown in FIG. 8B. Any other colors can be used as the screen color of the external display unit 21 in the erase mode.

Figure 5:
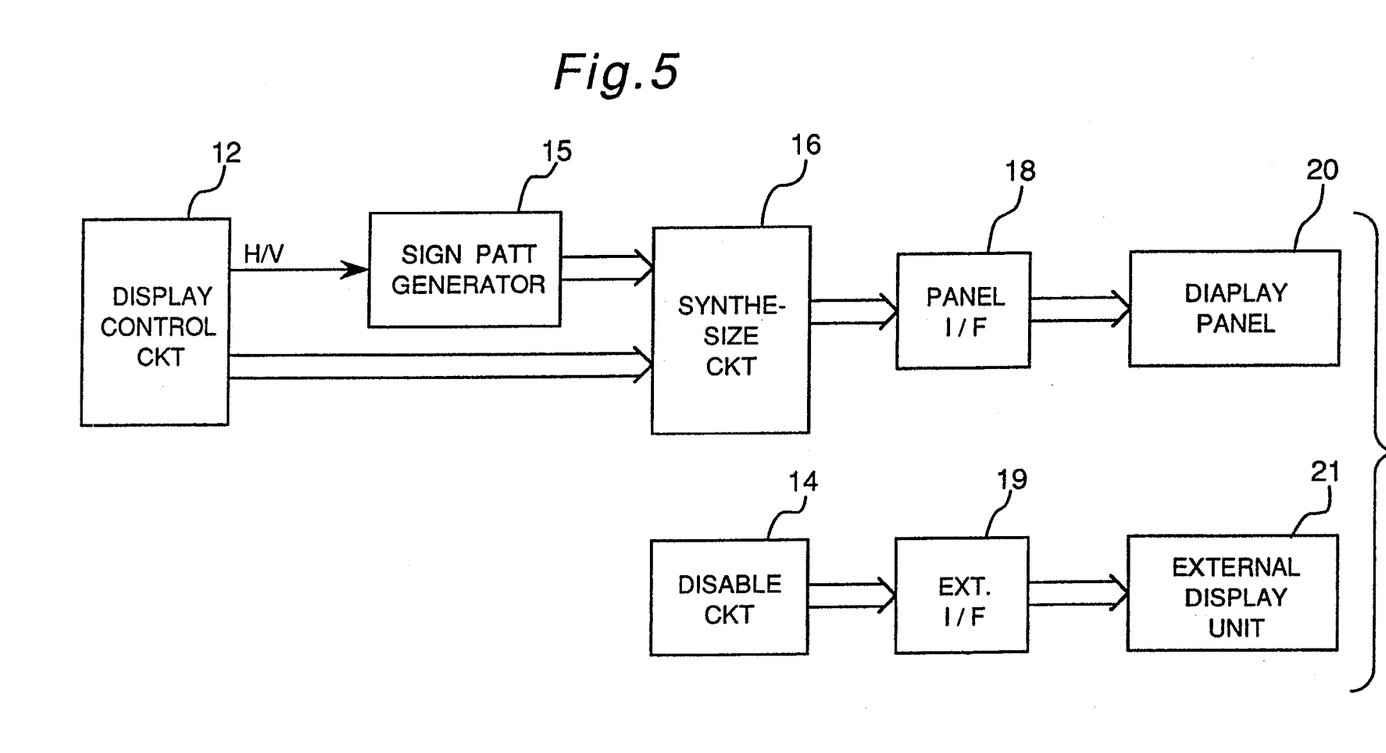
FIG. 5 is a block diagram of an image display device equivalent to the image display device of FIG. 2 when it is in the erase mode.

The construction of the image display device in the erase mode is equivalent to that shown in FIG. 5 in terms of flow of data to be sent to the display panel 20 and the external display unit 21. The CPU 11 and the control circuit 17 are omitted from FIG. 5.

Switching between the normal, freeze and erase modes can be done by operating a function key (not shown), for example, on a keyboard of the computer.

According to this embodiment, the following advantages are expected.

Assume that a lecturer is backing or skipping pictures on the display panel 20 during his or her lecture to search for a picture to be displayed next on the screen of the external display unit 21. In this case, the lecturer can bring the image display device into the freeze mode and keep presenting a static image to the audience while he is finding the desired picture. In addition, if a lecturer wants to check pictures for presentation immediately before his or her lecture starts, the lecturer may bring the image display device into the erase mode during the checking of the pictures. Seeing a monochromatic screen of the external display unit, the audience will understand that the lecture has not yet started. While the image display device is in the freeze mode and the erase mode, the freeze sign 31 and the erase sign 32 are displayed on the display panel 20, respectively. Therefore, the lecturer or operator of the device can know the display conditions of the external display unit 21 only looking at the screen of the display panel 20.

As describe above, the image display device of this embodiment can erase and freeze an image on the external display unit 21 when required while the display panel 20 keeps displaying pictures. In addition, because the signs 31, 32 indicating the display conditions of the external display unit 21 are also displayed on the display panel 20 along with pictures, an operator can know the display conditions of the external display unit 21 only by seeing the signs 31, 32 on the panel display 20 and without troubling to go to check the external display unit 21. This feature is useful especially when the external display unit 21 is set up in a remote place.

Figure 9:
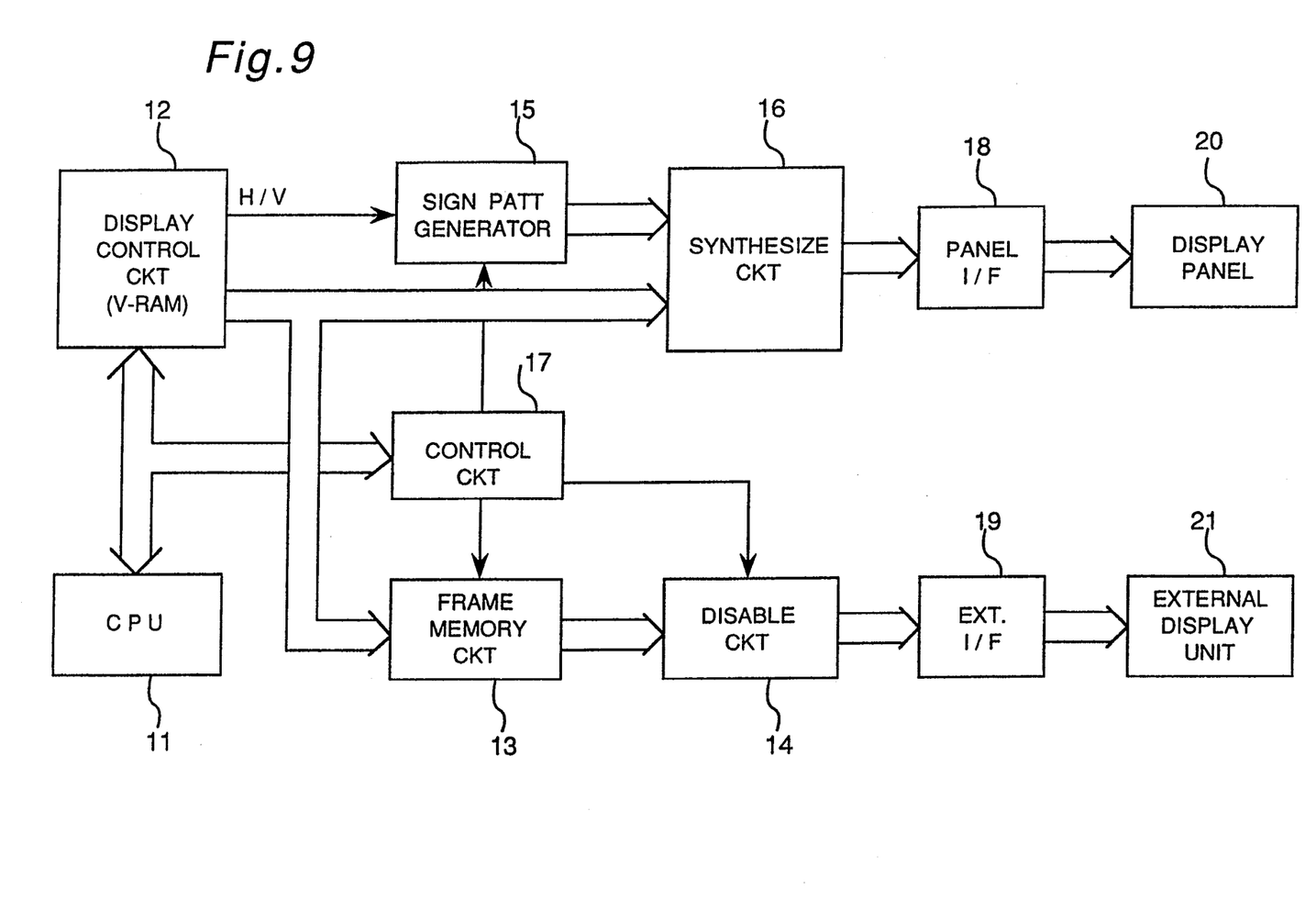
FIG. 9 is a block diagram of an image display device according to another embodiment of the present invention.

In the above embodiment, the synthesize circuit 16 is controlled to stop operating during the normal mode. However, the synthesize circuit 16 can be designed to operate in response to a synchronous signal contained in display data received from the display control circuit 12 and synthesize the display data output from the display control circuit and pattern data received from the sign pattern generator 15 in all modes of the image display device, without being controlled by the control circuit 17 as shown in FIG. 9. In this case, if the control circuit 17 controls the sign pattern generator 15 not to output pattern data in the normal mode, then, the synthesize circuit 16 can output only display data received from the display control circuit 12 and the display panel 20 will display only an image without any sign, as in the above embodiment. However, even a sign corresponding to the normal mode (referred to as a normal sign) can be displayed, similarly to the freeze sign 31 and the erase sign 32, if the sign pattern generator 15 is designed properly.

In the above embodiment, the present invention is applied to an image display device for a portable computer having the built-in display panel 20. However, the present invention can be applied to an image display device incorporating a CRT.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image display device which is connectable with an external display means such that an identical image can be simultaneously displayed on the external display means as well as on its own display means, comprising:
   a central processing unit;
   a display control circuit for outputting image data corresponding to an image to be displayed and a synchronous signal under control of the central processing unit, the image data and the synchronous signal constituting display data;
   a first display means for displaying an image based on the display data output from the display control circuit;
   a first interface connected with the first display means;
   a second interface connectable with a second external display means;

a memory circuit connected between the display control circuit and the second interface and having an internal memory to and from which display data received from the display control circuit is written and read out, the memory circuit having a write mode wherein display data in the internal memory is rewritten and the rewritten display data is output from the memory circuit, and a write inhibit mode wherein rewriting of display data in the internal memory is inhibited such that the display data stored in the internal memory without being rewritten is read out and output from the memory circuit;

a disable circuit connected between the memory circuit and the second interface for, when in operation, inhibiting display data received from the memory circuit from being output to the second interface, and outputting monochromatic display data instead of the display data received from the memory circuit such that a screen of the second external display means exhibits a single color;

a sign pattern generator for, on receiving the synchronous signal from the display control circuit, outputting pattern data corresponding to a sign indicating display mode conditions of the second external display means;

a synthesize circuit for synthesizing display data received from the display control circuit and pattern data received from the sign pattern generator and outputting the synthesized display data to the first display means through the first interface;

a control circuit for controlling the memory circuit and the disable circuit under control of the central processing unit such that:

during a normal mode of the image display device wherein an identical image is displayed on the first display means and the second external display means at the same time, the memory circuit assumes the write mode and the disable circuit does not operate;

during a freeze mode of the image display device wherein an image on the screen of the second external display means is frozen, the memory circuit assumes the write inhibit mode, and the disable circuit does not operate; and during an erase mode of the image display device wherein an image is erased from a screen of the second external display means, the disable circuit operates.

2. The image display device as claimed in claim 1, wherein the control circuit also controls the synthesize circuit such that the pattern data received from the sign pattern generator and the display data received from the display circuit are synthesized-only when the image display device is in the freeze mode and in the erase mode.

3. The image display device as claimed in claim 1, wherein the control circuit controls the sign pattern generator to output the pattern data only when the image display device is in the freeze mode and in the erase mode.

4. An information processing system including a central processing unit, a display control circuit for producing image data and a first image display device responsive to said image data from said display control circuit, said system further comprising:

a second image display device separate and distinct from said first image display device;

a memory circuit having an input connected to receive said image data from the display control circuit and an output;

a disable circuit for selectively connecting said memory circuit output to the second image display device;

a control circuit responsive to the central processing unit and connected to control both the memory circuit and the disable circuit in three distinct modes so that in a first normal mode the same image is displayed on the first and second image display devices, and in a second erase mode the image produced by said image data is displayed only on the first image display device with a monochromatic raster displayed on the second image display device and in a third freeze mode the first image display device produces an image in response to said image data from the display control circuit while the second image display device produces a static image of the image data of the memory output at the commencement of the freeze mode;

a sign pattern generator connected to the control circuit for producing pattern data indicative of said first, second or third modes; and a synthesize circuit responsive to the sign pattern generator and connected between the display control circuit and the first image display device for synthesizing the image data and pattern data to produce a synthesized data image on the first image display device.

5. An information processing system as in claim 4 wherein the memory circuit includes a memory means to and from which image data from the display control circuit is received, written and read out, said memory means having a write mode wherein image data in the memory means is rewritten and output and a write inhibit mode wherein rewriting of image data from the display control circuit is inhibited, said write and write inhibit modes being controlled by said control circuit.

6. An information processing system as in claim 4 wherein the central processing unit, display control circuit and first image display device are included in a portable computer unit and said second image display device is a display device external to said portable computer unit.

7. An information processing system as in claim 6 wherein the second image display device is a cathode ray tube display device.

* * * * *